US011954189B2

(12) United States Patent
Erramilli et al.

(10) Patent No.: US 11,954,189 B2
(45) Date of Patent: Apr. 9, 2024

(54) METHOD AND SYSTEM FOR CONTEXTUAL USER LOGON AUTHENTICATION

(71) Applicant: salesforce.com, inc., San Francisco, CA (US)

(72) Inventors: Vijay Erramilli, San Francisco, CA (US); Regunathan Radhakrishnan, San Francisco, CA (US); Anuj Gargeya Malkapuram, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 255 days.

(21) Appl. No.: 17/589,617

(22) Filed: Jan. 31, 2022

(65) Prior Publication Data

US 2023/0244766 A1 Aug. 3, 2023

(51) Int. Cl.
*G06F 21/31* (2013.01)

(52) U.S. Cl.
CPC .................................. *G06F 21/316* (2013.01)

(58) Field of Classification Search
CPC ............................... G06F 21/316; G06F 21/31
See application file for complete search history.

(56) References Cited

U.S. PATENT DOCUMENTS

| | | | | |
|---|---|---|---|---|
| 2017/0126710 | A1* | 5/2017 | De-Levie | H04L 63/1425 |
| 2021/0044578 | A1* | 2/2021 | Chan | H04L 63/04 |
| 2021/0051015 | A1* | 2/2021 | Widmann | H04L 9/0866 |
| 2021/0264003 | A1* | 8/2021 | Solano | G06N 5/01 |
| 2021/0349979 | A1* | 11/2021 | Cohen | H04L 63/1425 |
| 2022/0131844 | A1* | 4/2022 | Sherlock | H04L 63/105 |

* cited by examiner

*Primary Examiner* — Vu V Tran
(74) *Attorney, Agent, or Firm* — Butzel Long; Donald J. Lecher

(57) ABSTRACT

A method and system of authenticating a user logon builds a user logon profile with a plurality of user logon features gathered during at least one successful attempted user logon, determines a logon feature novelty score for each feature, receives a user logon request for authentication and extracts current user logon features, retrieves corresponding logon feature novelty scores, determines a first distance function score for the corresponding logon feature novelty scores of the current user logon features, builds a failed logon attempt database, determines a failed logon feature novelty score, extracts the failed logon feature novelty scores corresponding to current user logon features, determines a second distance function score for the corresponding failed logon feature novelty scores of the current user logon features, and determining to one of allow or deny the user logon request based on at least one of the first distance function score and the second distance function score.

20 Claims, 8 Drawing Sheets

METHOD AND SYSTEM FOR CONTEXTUAL USER LOGON AUTHENTICATION

A method and system for a contextual-based user logon authentication that passively checks a user logon request based on a pre-built user logon profile and a collection of failed logon attempts.

BACKGROUND

Current authentication systems have the following flow: users typically encounter a page or portal where they are asked to enter username and password; either with only username first and if that works, (i.e., where the user is recognized to have been previously registered), then the password is requested, or both may be requested at the same time.

When the user enters these details, a check is done in the backend database to validate the username/password. If a match is found, the check succeeds, else a failure message is sent back to the user that the logon failed. In many conventional cases, a second factor, (a numeric code via e.g., SMS, mobile app, YubiKey), is requested of the logon user after the initial successful logon, (also referred to as 2nd factor-authentication check), for additional identification and to improve security as users may not have good password hygiene and/or the user credentials may have been disclosed in an unrelated security breach event.

The convention authentication process, even with a second factor has security limitations, namely, that username and passwords by themselves are not secure given the number and frequency of privacy data breaches. Second, multi-factor authentication is not completely impenetrable and there many methods have been known to circumvent the second factor authentication.

BRIEF SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, method of authenticating a user logon provides for building a user logon profile with a plurality of user logon features gathered during at least one successful attempted user logon, determining a logon feature novelty score for each of the plurality of user logon features based on a number of user logon feature events over a total number of user logon events, receiving a user logon request for authentication and extracting current user logon features associated with the user logon request, retrieving corresponding logon feature novelty scores of the current user logon features from the user logon profile based on the extracted current user logon features, determining a first distance function score for the corresponding logon feature novelty scores of the current user logon features, building a failed logon attempt database with a plurality of failed user logon features corresponding to a plurality of failed user logon attempts, determining a failed logon feature novelty score for each of the plurality of failed user logon features based on a number of failed user logon feature events over a total number of failed user logon events, extracting the failed logon feature novelty scores corresponding to current user logon features, determining a second distance function score for the corresponding failed logon feature novelty scores of the current user logon features, and determining to one of allow or deny the user logon request based on at least one of the first distance function score and the second distance function score.

In another embodiment disclosed herein, a method includes providing a profile builder module configured to build a user logon profile with a plurality of user logon features gathered during at least one successful attempted user logon, and determine a logon feature novelty score for each of the plurality of user logon features based on a number of user logon feature events over a total number of user logon events.

The method further includes providing a user logon score module configured to receive a user logon request for authentication and extracting current user logon features associated with the user logon request, retrieve corresponding logon feature novelty scores of the current user logon features from the user logon profile based on the extracted current user logon features, and determine a first distance function for the corresponding logon feature novelty scores of the current user logon features.

The method further includes providing a failed logon score module configured to build a failed logon attempt database with a plurality of failed user logon features corresponding to a plurality of failed user logon attempts, determine a failed logon feature novelty score for each of the plurality of failed user logon features based on a number of failed user logon feature events over a total number of failed user logon events, extract the failed logon feature novelty scores corresponding to current user logon features, and determine a second distance function for the corresponding logon feature novelty scores of the current user logon features. The method finally includes determining to one of allow or deny the user logon request based on at least one of the first distance function and the second distance function.

In another embodiment disclosed herein, a system includes a user interface logon portal configured to receive a user logon request for authentication, at least one of an identity store and a multifactor authentication check module configured to check parameters of the user logon request to determine authenticity.

The system further includes a context check module including a profile builder module configured to build a user logon profile with a plurality of user logon features gathered during at least one successful attempted user logon, and determine a logon feature novelty score for each of the plurality of user logon features based on a number of user logon feature events over a total number of user logon events, a logon score module configured to receive a user logon request for authentication and extracting current user logon features associated with the user logon request, retrieve corresponding logon feature novelty scores of the current user logon features from the user logon profile based on the extracted current user logon features, and determine a first distance function for the corresponding logon feature novelty scores of the current user logon features, and a failed logon score module configured to build a failed logon attempt database with a plurality of failed user logon features corresponding to a plurality of failed user logon attempts, determine a failed logon feature novelty score for each of the plurality of failed user logon features based on a number of failed user logon feature events over a total number of failed user logon events, extract the failed logon feature novelty scores corresponding to current user logon features, and determine a second distance function for the corresponding logon feature novelty scores of the current user logon features. The system further is configured to determine to one of allow or deny the user logon request based on at least one of the first distance function and the second distance function.

BRIEF DESCRIPTION OF THE SEVERAL VIEWS OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

The embodiments will be better understood from the following detailed description with reference to the drawings, which are not necessarily drawing to scale and in which.

DETAILED DESCRIPTION

The disclosure herein presents system and method to perform authentication of user logons considers contextual information about the logon event to determine whether to authenticate the user or not and may supplement convention logon mechanisms. This new authentication mechanism comprises of a typical authentication architecture (front end for user to enter username/password; logon credentials, user data base in the backend that contains username/password for checking), an independent module for checking/validating MFA checks, and a third module that checks for context of the user logon.

Figure 1:
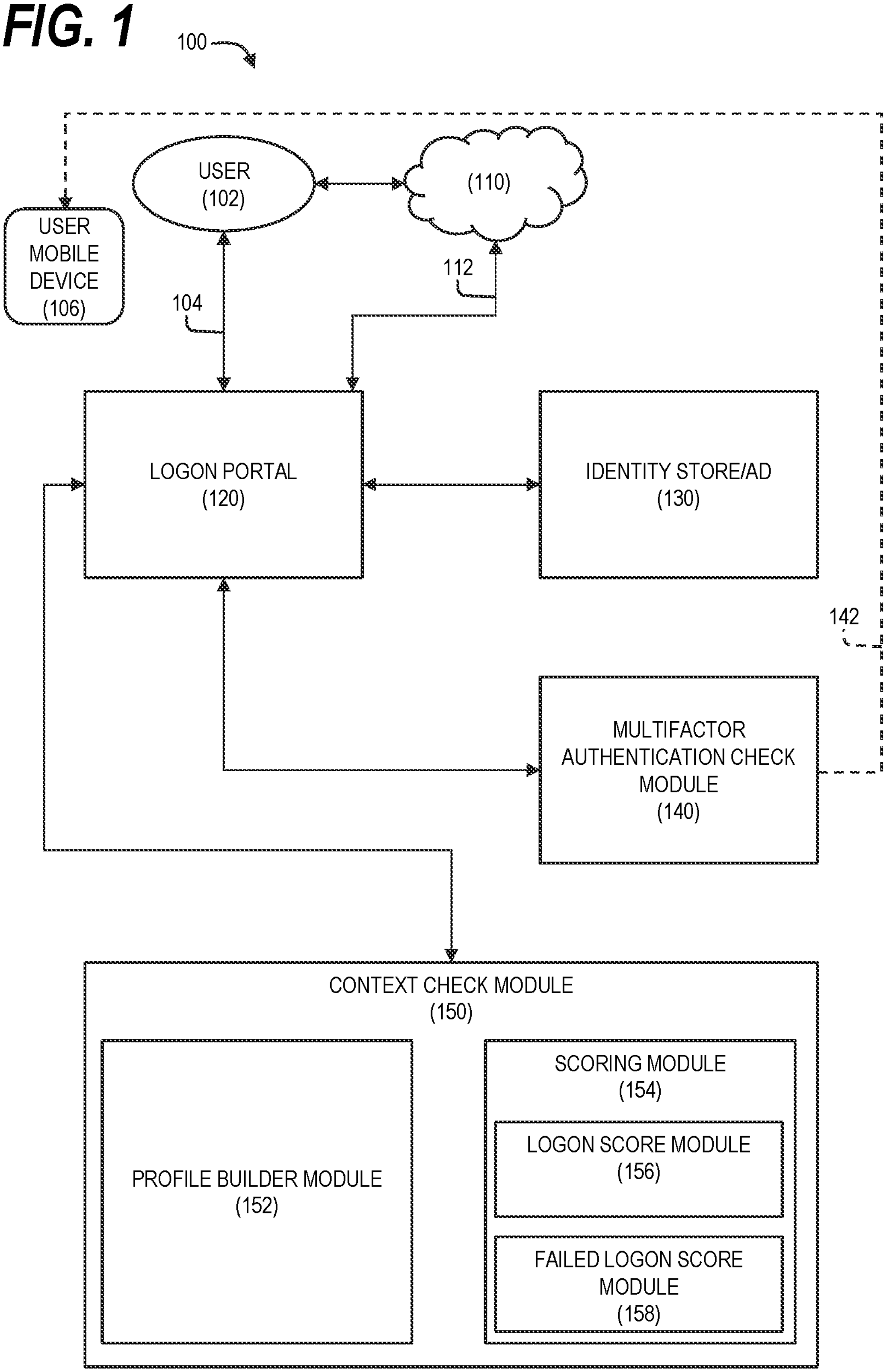
FIG. 1 illustrates a schematic diagram of the contextual logon authentication system.

FIG. 1 illustrates a user 102 may interface with a logon portal 120 that either directly receives a user logon request 104 or indirectly receives a user logon request 112 via a distributed network 110, like the Internet. The logon portal 120 may be a dedicated hardware device for user authentication, such as a physical perimeter security system, a web browser on a computer, or a mobile communication device.

The logon portal 120 interfaces with an identity store, (such as active directory, (AD)), 130 to validate the credentials entered by the user 102.

If the username and/or password is authenticated by the identity store 130, the logon portal 120 then contacts the multifactor authentication (MFA) check module 140. For example, the MFA check module 140 may send a second authentication token 142 to a device of the user 102, for example, a user mobile communication device 106 to complete the MFA check process.

If the MFA check process authenticates, then a context check is carried out at a context check module 150, including a profile module 152 and a score module 154. The context check process, (described in greater detail below), begins passively, i.e., requiring no user interaction, and in parallel with processing the user credential information by the identity store 130 and/or the MFA check module 140. The user 102 does not need to enter any new information for the context check module 150 to proceed as it occurs in the background of the other two processes.

The output of the context check module 150 is sent back to the portal as score, and depending on the value of score, the logon portal 120 may choose one from a number of different logon outcomes as further described below.

Context Check

The context check module 150 includes two scoring modules that run simultaneously with the user logon request via the logon portal 120: the profile builder module 152 and the scoring module 154.

A) The Profile Builder Module

Figure 2:
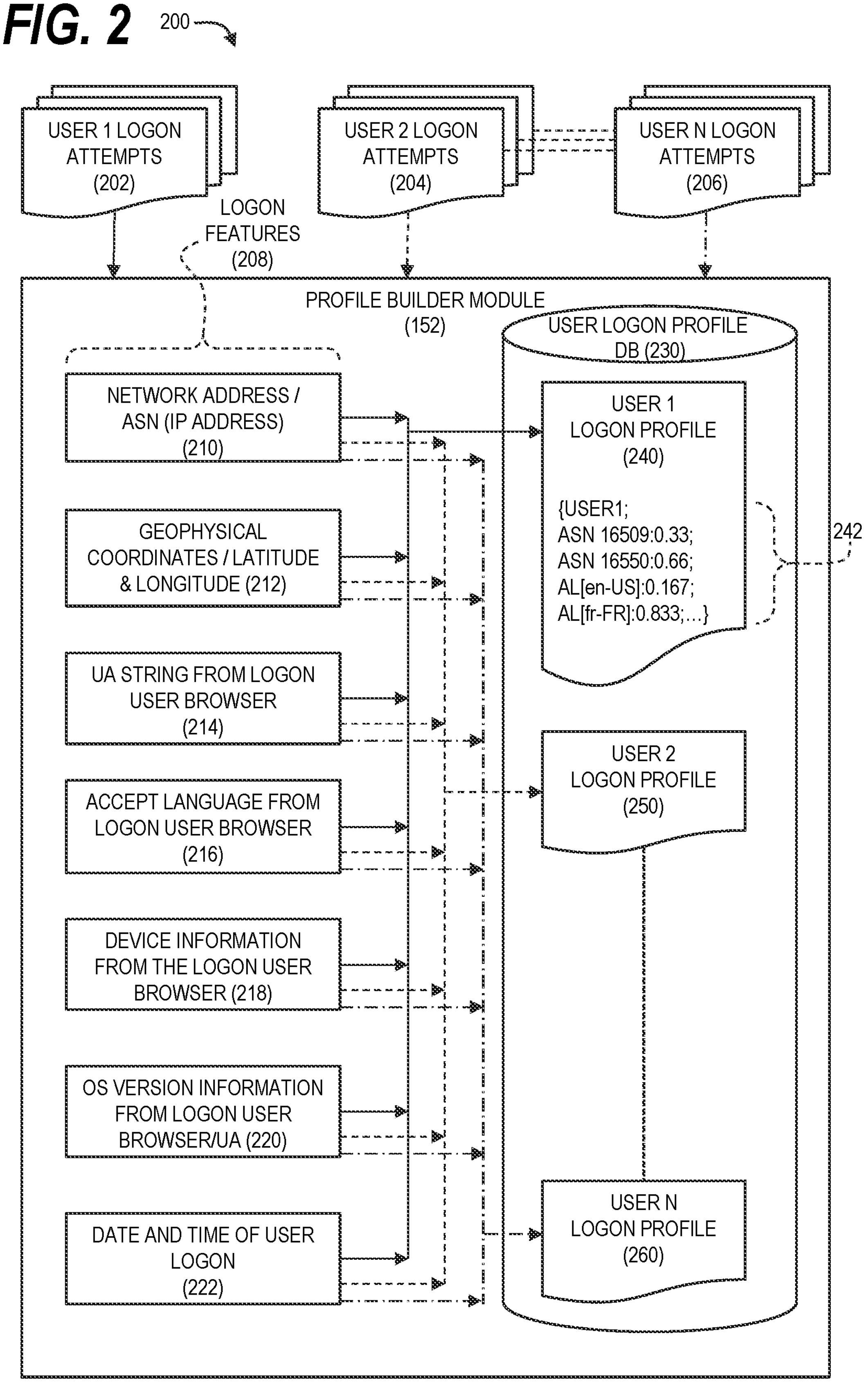
FIG. 2 illustrates a schematic diagram of the profile builder module of FIG. 1.

The profile builder module 152 builds a per-user logon profile, see FIG. 2, using contextual data gathered during successful logon attempts. For every user, for example, User 1 202, User 2 204 to User N 206, after a successful logon attempt, the following contextual user logon features 208 may be extracted the user logon process:

- Network address or Autonomous System Number (ASN) 210 of the user logon request. The ASN is a globally unique identifier that defines a group of one or more IP prefixes run by one or more network operators that maintain a single, clearly-defined routing policy. These groups of IP prefixes are known as autonomous systems and the ASN allows the autonomous systems to exchange routing information with other autonomous systems.
- Latitude and longitude or geophysical coordinates 212 of the user logon request defining the location where the request originates.
- User Agent (UA) string 214 from the browser that identifies which browser is being used, what version of the browser, and upon which operating system the browser is operating on.
- Accept Language 216 having language and country designations from the logon user browser.
- Device information 218 from the logon user browser.
- OS version 220 from the logon user browser/UA.
- Date of user logon 222 that may be further converted to day of week.
- Time of user logon 222 that may further convert to time segments of a day, e.g., morning, afternoon, evening, evening.

For each monitored logon user, a user logon profile, e.g., 240, 250, 260, may be built based on logon events logged over a monitoring period of time, for example, the past 30 days of logon event activity. The user logon profiles may be store centrally or distributed in a user logon profile database 230.

For each monitored logon user, a user logon profile may only be built for users who have a minimum number of logon attempts during the monitoring period of time, e.g., at least 5 logon attempts over a 30-day monitoring period.

For each monitored logon user, the above identified user logon features may be used to calculate a per-logon feature novelty score defined as:

$$[1-(\text{frequency count of logon feature count in events})/\text{total number of logon events}].$$

For each user, the user logon profile may be defined as a vector 242 of the per-logon feature novelty scores.

In an exemplary embodiment, for example, User 1 may have a total of 6 logon attempts 202 over the past 30 days, where 4 of the 6 logon attempts come from ASN 16509, and the remaining 2 logon attempts come from ASN 16550.

For User 1, the ASN novelty scores for each ASN feature may be determined as:

$$\text{ASN 16509: } [1-(4/6)]=0.33, \text{ and}$$

$$\text{ASN 16550: } [1-(2/6)]=0.66.$$

Continuing the exemplary embodiment above, if User 1's logon monitored the user logon feature of Accept Language (AL) from the browser, and for example, if the AL features may be: {[en-US], 5 times, [fr-FR], 1 time}. The AL novelty score would be determined to be $$\text{AL [en-US]: } [1-(5/6)]=0.167, \text{ and}$$

$$\text{AL [fr-FR]: } [1-(1/6)]=0.833.$$

A logon profile for User 1 may then reduce to a logon profile vector consisting of the identified features paired with corresponding calculated novelty scores, e.g., "{User 1; ASN 16509:0.33; ASN 16550:0.66; AL [en-US]:0.167; AL [fr-FR]:0.833}," see 242 in FIG. 2 as representative example.

B) The Scoring Module

The scoring module 154 scores a user logon attempt, after a user logon profile has been built by the profile builder module 152. The scoring module 154 includes two sub-components: a logon score module 156 that calculates a user logon profile-based score for each user logon attempt; and a failed logon score module 158 that calculates a user logon failed logon attempt-based score for each user logon attempt.

Determining a User Logon Profile-Based Score

The logon score module 156 determines a user logon profile-based score for each new user logon attempt based on a past history of a respective logon user stored as the user logon profile, see above.

A user logon profile-based score of "1" for the logon score module 156 identifies a totally anomalous logon attempt, (e.g., a logon that has never been seen before), and a user logon profile-based score of "0" identifies a logon attempt that is completely familiar to the context check module 150. Values of the user logon profile-based score between the values "0" and "1" indicate how close a determined user logon profile-based score is to either of the range boundaries.

Figure 3:
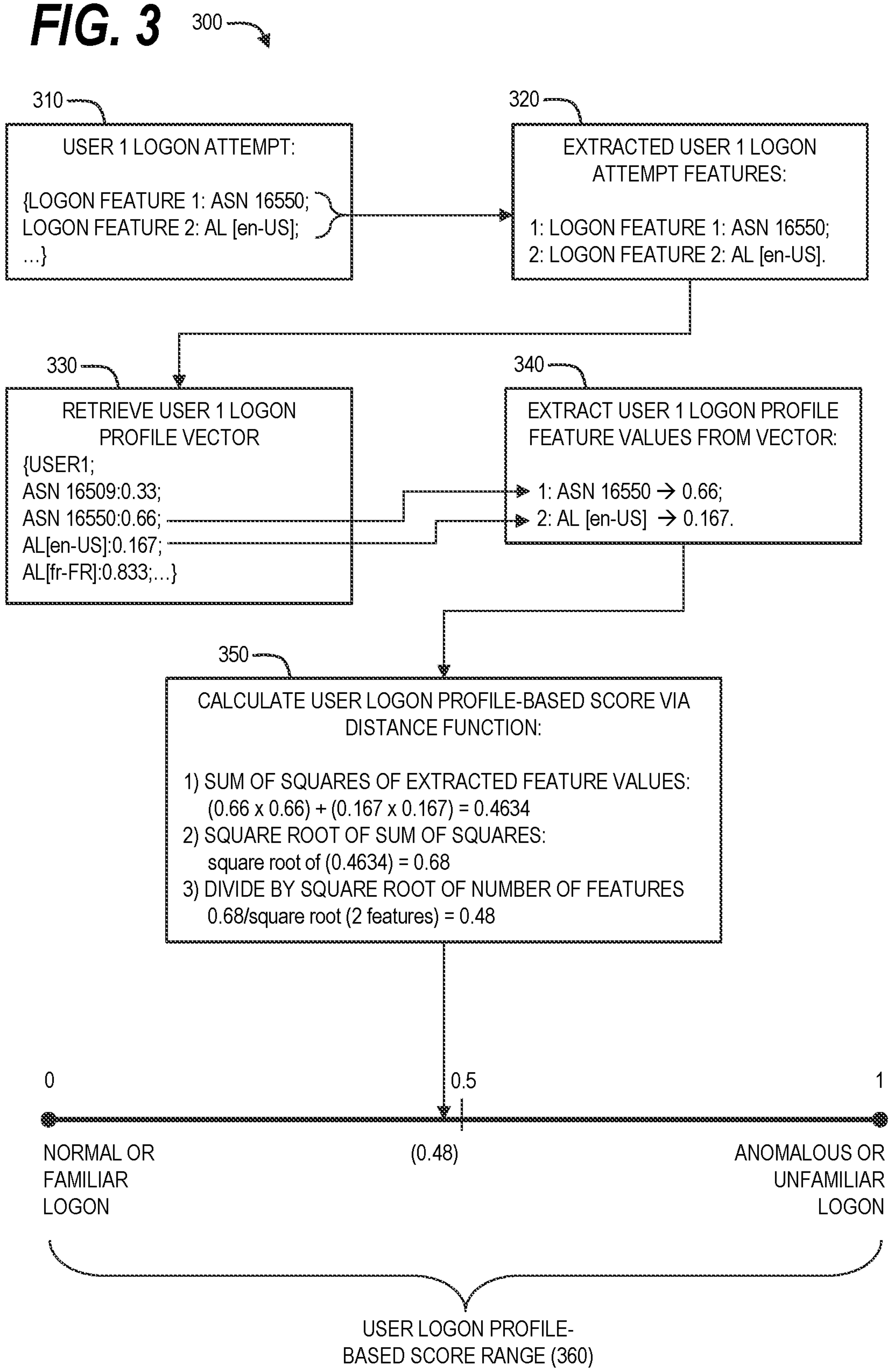
FIG. 3 illustrates a schematic diagram of the profile builder module calculating a user logon profile-based score.

For every user logon attempt that has successfully passed the first username/password check at the identity store/AD 130, and/or the MFA check module 140, a check is subsequently performed to determine if the user logon attempt is associated with an existing built user logon profile, e.g., 230, 232 and 234 of FIG. 2. If a user logon profile exists, the logon score module 156 determines a user logon profile-based score for that particular user logon attempt by:

- Identifying the user logon features 310, of FIG. 3, from the current user logon attempt and update the respective user logon profile accordingly;
- Looking up the respective user logon profile 320 and extracting the user logon novelty scores 330 for each of the user logon features corresponding to the user logon features identified in the current user logon attempt; and
- Calculating 340 the user logon profile-based score using a distance function that takes the corresponding user logon novelty scores as input to the distance function which is the L2 norm of all the user logon novelty scores, (the L2 norm calculates the distance of the vector coordinate from the origin of the vector space. As such, it is also known as the Euclidean norm as it is calculated as the Euclidean distance from the origin. The result is a positive distance value).

The user logon profile-based scoring distance function is calculated as follows:

$$\text{Calculate sum of squares of all user feature novelty scores;} \tag{1}$$

$$\text{Calculate square root of (1); and} \tag{2}$$

$$\text{Divide (2) with the square root of the number of logon features used,} \tag{3}$$

where (3) normalizes the user logon profile-based scores between a value of "0" and "1."

In another aspect of the above exemplary embodiment of User 1 who has a built user logon data profile, when a User 1's new logon attempt includes a location of ASN 16550 and an Accept Language of [en-US], then only these two features of the current logon attempt are considered, i.e., ASN and Accept Language, and a user logon profile-based score calculation using the above distance function would proceed as follows:

User 1 input:

ASN 16550=0.66 (ASN logon data profile)

AL [en-US]=0.167 (AL logon data profile)

Sum of the Squares of each corresponding feature:

$$(0.66\times0.66)+(0.167\times0.167)=0.4634 \tag{4}$$

Square root of (4):

$$\text{square root of } (0.4634)=0.68 \tag{5}$$

Divide (5) with square root of the number of logon features:

$$0.68/\text{square root (2 features)}=0.48 \tag{6}$$

Thus, the user logon profile-based score determined by the logon score module 156 is 0.48 at (6). This value indicates that compared to the past behavior of User 1, the current logon attempt is approximately half (0.48) the distance from being completely normal or familiar, (i.e., a score of "0"), to being completely anomalous or unfamiliar, (i.e., a score of "1"), relative to the user logon profile-based score range 360 as illustrated in FIG. 3.

Determining a User Logon Failed Logon Attempt-Based Score

Figure 4:
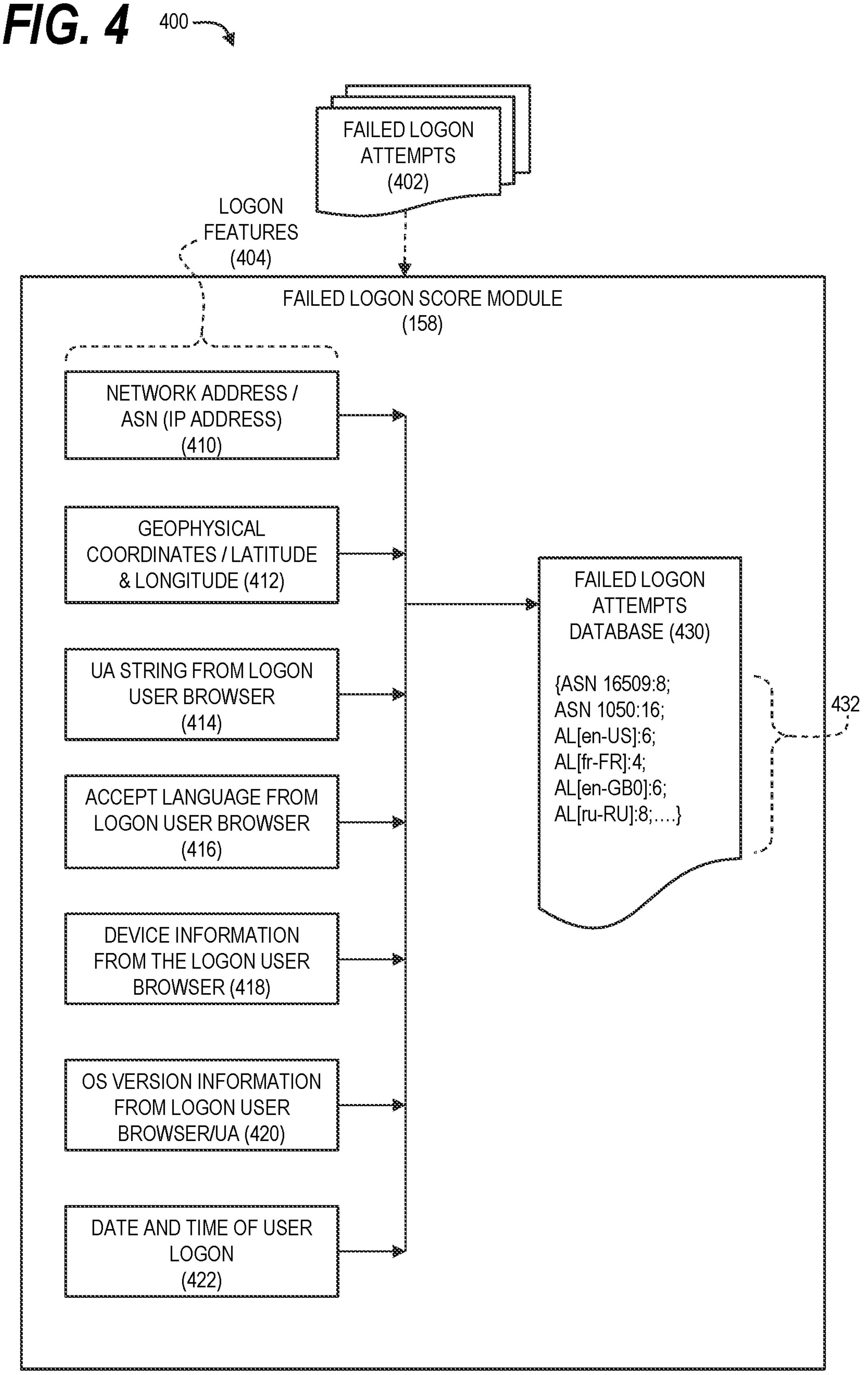
FIG. 4 illustrates a schematic diagram of the failed logon score module 158 of FIG. 1.

The second module of the context check module 150, the failed logon score module 158, determines a user logon failed logon attempt-based score of the user logon attempt that considers an entire collection 402, see FIG. 4, of failed logon authentication attempts from the entirety of user logon event logs. In this manner, context is captured based on the particular content of the failed logon attempts.

A user logon failed logon attempt-based score value of "0" identifies a logon that is completely familiar with other failed user logon attempts, hence there is a higher chance of the logon attempt being malicious if it shares contextual data similar to failed historical user logons, and a user logon failed logon attempt-based score value of "1" identifies a logon that is completely anomalous or unfamiliar with other failed user logon attempts, hence there is a lower chance of the logon attempt being malicious if it fails to share contextual data similar to failed historical user logons. Values of the user logon failed logon attempt-based score between the values "0" and "1" indicate how close a determined user logon failed logon attempt-based score is to either of the range boundaries.

Figure 5:
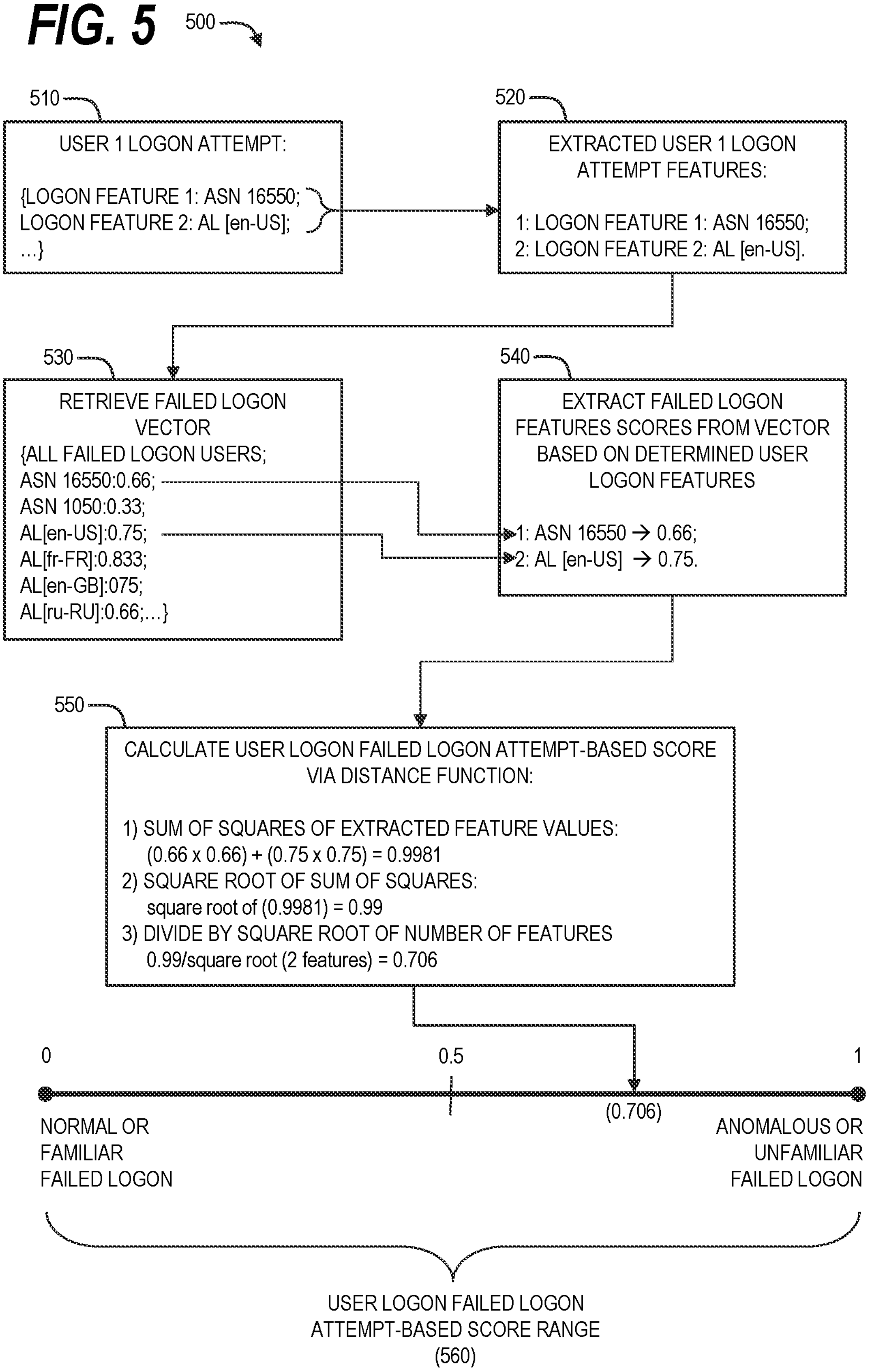
FIG. 5 illustrates a schematic diagram of the failed logon score module 158 calculating a user logon failed logon attempt-based score.

The failed logon score module 158, uses the collection of all failed logon attempts 402 of the entire user base over a predetermined period, (e.g., the most recent 30 days), and operates by:

- Collecting all failed user authentication logs 402 over a predetermined period of time, (e.g., 30 days) to build a failed logon attempt database 430 using the same set of features 404 mentioned in the profiling section above, namely, a Network address or Autonomous System Number (ASN) 410, Latitude and longitude or geo-physical coordinates 412, User Agent (UA) string 414, Accept Language 416, Device information 418, OS version 420, and Date and Time of user logon 422;
- Generating a failed profile vector 432 consisting of pairs of failed logon attempt features with corresponding failed logon attempt frequency counts for all logon features identified across all the user base who had failed logon attempts;
- For the current logon attempt, 510, see FIG. 5, after extracting the user logon attempt features 520, instead of looking at the user's profile, lookup the failed profile vector 530 and extract the failed logon attempt frequency counts for the identified features 540 seen in the current logon attempt, (similar to the above scoring step); and
- Perform the same distance function scoring as the logon score module 156 described above, calculating 550 the L2 norm to get a user logon failed logon attempt-based score 560 between the range of (0-1).

Continuing the exemplary embodiment above of User 1 attempting a current logon, assume the failed logon authentication logs consist of a total of 24 failed logon attempts having the following data:

ASN
ASN 16550, 8 attempts, and
ASN 1050, 16 attempts;
Accept Language
[en-US], 6 attempts,
[fr-FR], 4 attempts,
[en-GB], 6 attempts, and
[ru-RU], 8 attempts.

Hence, a failed logon vector may be created containing sets of failed logon features and failed logon feature novelty scores calculated in the same manner as disclosed above to create the failed logon vector. For example, ASN 16550: [1−(8 attempts/24 total attempts)]=0.66

ASN 1050: [1−(16 attempts/24 total attempts)]=0.33

AL [en-US]: [1−(6 attempts/24 total attempts)]=0.75

AL [fr-FR]: [1−(4 attempts/24 total attempts)]=0.833

AL [en-GB]: [1−(6 attempts/24 total attempts)]=0.75

AL [ru-RU]: [1−(8 attempts/24 total attempts)]=0.66

Thus the failed logon vector may be expressed as, e.g., "{ALL FAILED LOGON USERS; ASN 16550:0.66; ASN 1050:0.33; AL[en-US]:0.75; AL[fr-FR]:0.833; AL[en-GB]:0.75; AL[ru-RU]:0.66}".

Given the logon attempt of User 1 from the example above, with ASN 16550 and Accept Language [en-US], then considering only these 2 features, (i.e., ASN and Accept Language), the distance function-based user logon failed logon attempt-based score calculation may proceed as follows:

User 1:

ASN 16550: [1−(8 attempts/24 total attempts)]=0.66 (ASN logon data profile)

AL [en-US]: [1−(6 attempts/24 total attempts)]=0.75 (AL logon data profile)

Sum of the Squares of each corresponding feature:

$$(0.66\times0.66)+(0.75\times0.75)=0.9981 \quad (7)$$

Square root of (7):

$$\text{square root of } (0.9981)=0.99 \quad (8)$$

Divide (8) with square root of the number of failed logon attempt features, (i.e., ASN and AL):

$$0.99/\text{square root } (2 \text{ features})=0.706 \quad (9)$$

The calculated user logon failed logon attempt-based score is 0.706. This means the current logon attempt is somewhat 'distant' to the failed authentication logs, hence not that alarming, or not that anomalous.

Authentication Decisions Based on Score

Both of the user logon profile-based score and the user logon failed logon attempt-based score may be passed on to the logon portal 120 to make further authentication decisions.

For users who have no or a sparsely populated user logon profile, the user with the largest logon profile may be used as basis for scoring the user logon profile-based score and the user logon failed logon attempt-based score, until the "low" user profile gains enough logon attempts to build an active user logon profile.

Figure 6:
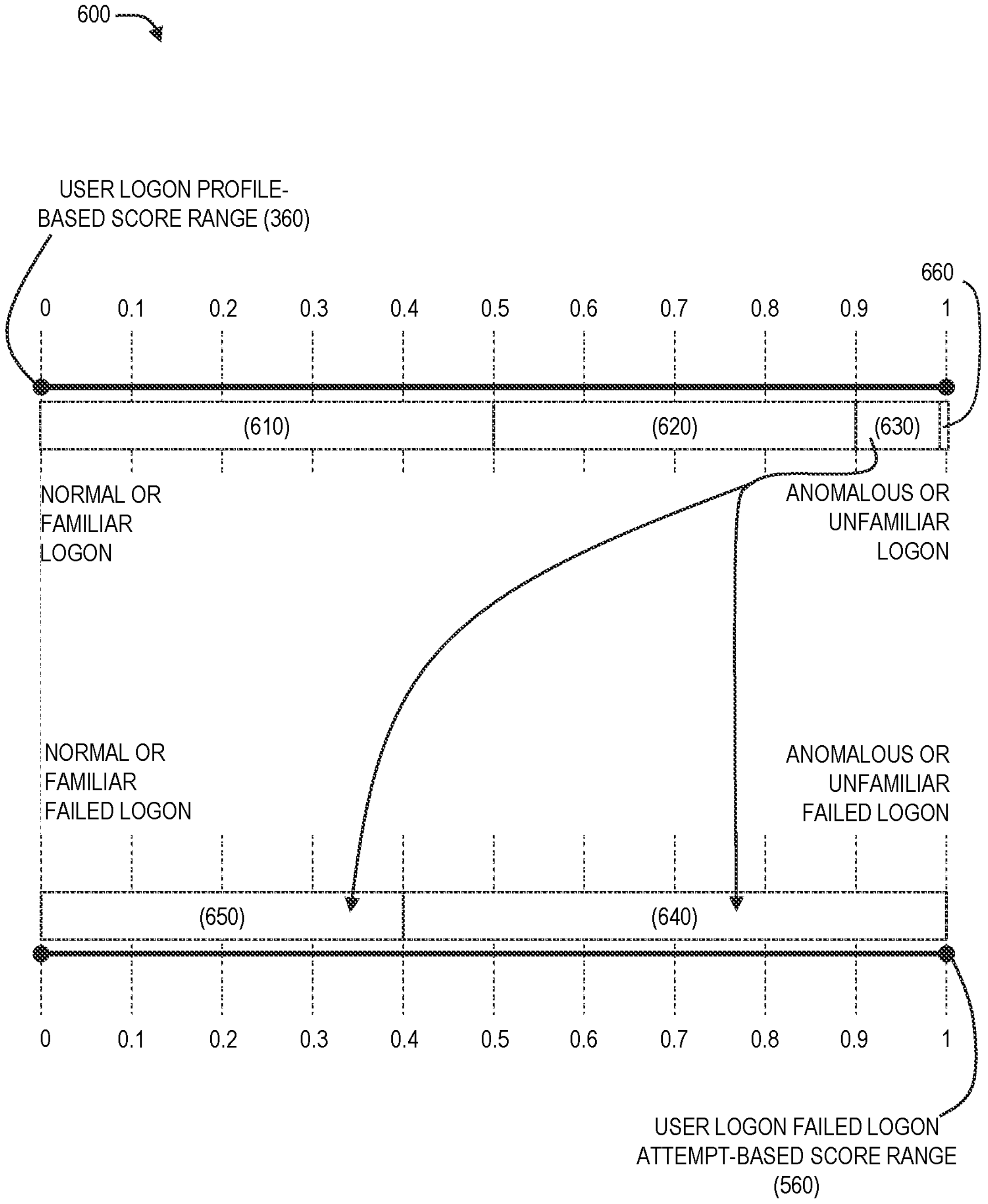
FIG. 6 illustrates a schematic diagram of system criteria used to make decisions regarding authenticating a user logon request based on the user logon profile-based score of FIG. 3 and the user logon failed logon attempt-based score of FIG. 5.

For example, FIG. 6 illustrates how the combination of scores between the user logon profile-based score and the user logon failed logon attempt-based score may be used to determine to authenticate a user logon request or to what level of authentication is further necessary to allow user access based on the user logon request and the contextual information.

For example, a user logon profile-based score from the logon score module 156 close to a value of "1" would identify a highly suspicious/anomalous logon attempt based on the user's past history, and a logon score close to "0" would identify a very familiar or non-anomalous logon attempt based on the user's past history.

For user logon profile-based scores 610 from the logon score module 156 close to a value of "0" and less than 0.5, the logon portal 120 may authenticate the user 102.

For user logon profile-based scores 620 from the logon score module 156 having a value between 0.5-0.9, the logon portal 120 may authenticate the user but with reduced access privileges during an access session.

For user logon profile-based scores 630 from the logon score module 156 having value between 0.9-0.99, the logon portal 120 may look at the user logon failed logon attempt-based scores from the failed logon score module 158 denoted by the failed score value range 560 of FIG. 4.

If the values of the user logon failed logon attempt-based score 640 are distant from "0" value, e.g., greater than a value of 0.4, the logon portal 120 may request the user 102 to enter a third authentication factor via the MFA check module 140 to authenticate the logon attempt.

If the values of the user logon failed logon attempt-based score 650 is closer to a "0" value, e.g., less than a value of 0.4, the logon portal may reject the user logon authentication attempt and consider the logon attempt to be malicious.

If the user logon profile-based score 660 from the logon score module 156 is greater than a value of 0.99, the logon portal 120 may refuse to authenticate the user 102 as this logon request may be considered highly anomalous and likely to be malicious.

Another embodiment is of a method of authenticating a user logon including building a user logon profile with a plurality of user logon features gathered during at least one successful attempted user logon, determining a logon feature novelty score for each of the plurality of user logon features based on a number of user logon feature events over a total number of user logon events, receiving a user logon request for authentication and extracting current user logon features associated with the user logon request, retrieve corresponding logon feature novelty scores of the current user logon features from the user logon profile based on the extracted current user logon features, determine a first distance function score for the corresponding logon feature novelty scores of the current user logon features, build a failed logon attempt database with a plurality of failed user logon features corresponding to a plurality of failed user logon attempts, determine a failed logon feature novelty score for each of the plurality of failed user logon features based on a number of failed user logon feature events over a total number of failed user logon events, extract the failed logon feature novelty scores corresponding to current user logon features, determine a second distance function score for the corresponding failed logon feature novelty scores of the current user logon features, and determining to one of allow or deny the user logon request based on at least one of the first distance function score and the second distance function score.

Another embodiment includes where the plurality of user logon features include at least one of: ASN data; geophysical location coordinate data; UA string data; Accept Language data; device information; OS version information; at least one of date and day of the user logon; and at least one of a time and part of a day of the user logon.

Another embodiment includes where the building of the user logon profile includes creating a user feature vector based on the plurality of user logon features and the associated logon feature novelty scores.

Another embodiment includes where the user logon profile is collected over a predetermined period of time.

Another embodiment includes where the building the user logon profile includes building a per-user logon profile database including a plurality of users.

Another embodiment includes updating the user logon profile with the current user logon features.

Another embodiment includes where the first distance function is calculated based on a square root of a sum of the squares of the corresponding logon feature novelty scores of the current user logon features from the user logon on profile over a square root of the number of the current logon features used in the user logon request.

Another embodiment includes where the second distance function is calculated based on a square root of a sum of the squares of the failed logon feature novelty scores corresponding to the current user logon features, over a square root of the total number of the failed logon features.

Another embodiment includes evaluating the determined first distance function being one of at or between a familiar value and an anomalous value.

Another embodiment includes where the determining to one of allow or deny the user logon request based on the first distance function includes determining one of how close or how far a score value determined from the distance function is to one of a familiar logon or an anomalous logon.

Another embodiment includes evaluating the determined second distance function being one of at or between a familiar value and an anomalous value.

Another embodiment includes where the determining to one of allow or deny the user logon request based on the second distance function includes determining one of how close or how far a score value determined from the distance function is to one of a familiar logon or an anomalous logon.

Another embodiment includes a method including providing a profile builder module configured to build a user logon profile with a plurality of user logon features gathered during at least one successful attempted user logon, and determine a logon feature novelty score for each of the plurality of user logon features based on a number of user logon feature events over a total number of user logon events. The method further includes providing a user logon score module configured to receive a user logon request for authentication and extracting current user logon features associated with the user logon request, retrieve corresponding logon feature novelty scores of the current user logon features from the user logon profile based on the extracted current user logon features, and determine a first distance function for the corresponding logon feature novelty scores of the current user logon features. The method further includes providing a failed logon score module configured to build a failed logon attempt database with a plurality of failed user logon features corresponding to a plurality of failed user logon attempts, determine a failed logon feature novelty score for each of the plurality of failed user logon features based on a number of failed user logon feature events over a total number of failed user logon events, extract the failed logon feature novelty scores corresponding to current user logon features, and determine a second distance function for the corresponding logon feature novelty scores of the current user logon features. The method further includes determining to one of allow or deny the user logon request based on at least one of the first distance function and the second distance function.

Another embodiment includes a system 100, for example in FIG. 1, including a user interface logon portal 120 configured to receive a user logon request 104 for authentication, at least one of an identity store 130 and a multi-factor authentication check module 140 configured to check parameters of the user logon request 104 to determine authenticity, and a context check module 150. The context check module 150 includes a profile builder module 152 configured to build a user logon profile with a plurality of user logon features gathered during at least one successful attempted user logon, and determine a logon feature novelty score for each of the plurality of user logon features based on a number of user logon feature events over a total number of user logon events, a logon score module 156 configured to receive a user logon request for authentication and extracting current user logon features associated with the user logon request, retrieve corresponding logon feature novelty scores of the current user logon features from the user logon profile based on the extracted current user logon features, and determine a first distance function for the corresponding logon feature novelty scores of the current user logon features, and a failed logon score module 158 configured to build a failed logon attempt database with a plurality of failed user logon features corresponding to a plurality of failed user logon attempts, determine a failed logon feature novelty score for each of the plurality of failed user logon features based on a number of failed user logon feature events over a total number of failed user logon events, extract the failed logon feature novelty scores corresponding to current user logon features, and determine a second distance function for the corresponding logon feature novelty scores of the current user logon features. The system further includes determining to one of allow or deny the user logon request based on at least one of the first distance function and the second distance function.

The embodiments presented herein present system and method to perform user logon authentication by considering contextual information about the logon event, both from the user and from failed user logon attempts, to decide whether to authenticate the user. The disclosed user logon authentication method includes a front end logon authentication architecture, or logon portal configured to allow a user to enter username and password as logon credentials, and user data base in a backend, or identity store, that contains username and password for checking, an independent module for checking and/or validating MFA checks, and a context checking module that checks for context of the user logon.

Based on the first two are active checks, where the user provides information, input or feedback, and the passive context check, where the user need not provide any information, input or feedback), a determination may be made to authenticate a user logon.

The method and system described herein contains a passive element that monitor past user logon activity and failed user logon activity to determine a security risk of new logon attempt.

Authentication mechanism relies on profiling and scoring modules that continuously ingest data to build user logon profiles of behavior and then use these profiles to assess legitimacy of an authentication logon attempt.

The scoring of the authentication attempt based on a notion of distance on what has been observed in the past, both from the user's own logon history and failed authentication logon attempts of the entire user base. This collective information provides the context used on determining a decision whether to authenticate the user logon request for authentication.

The method and system described herein supplements current authentication processes by continuously monitoring contextual information and user behavior and exploiting this information to authenticate the user logon. For each user, additional contextual information (network information: ASN, latitude/longitude of user logon location, browser information: user agent string, device information, user behavior: day, time of logon attempts) is monitored and exploited to build a user logon profile of the user where the profile represents typical logon behavior for the user over a predetermined period of time.

For every new logon attempt, the previously build user logon profile is compared against the new logon information based on attempted user logon characteristics, e.g., network information, browser information, user behavior, that are different and anomalous from what has been observed in the past.

Contextual data may also be used from failed logon authentication attempts collected from the entire user base. These fail user logon events contain logon characteristics representing users mistyping passwords, not passing multi-factor authentication, logon timeouts, etc. These logon failure logs also contain failed logon attempts by malicious actors who are trying to get in but cannot due to incorrect passwords or incorrect multi-authentication data, etc.

Comparing against this data and seeing if the current logon attempt is similar or closer to this data would mean a successful logon attempt that shares traits with what failed in the past. Hence, if a malicious successful logon is a series of failed logon attempts followed by a successful one, then the system and methods presented herein ensure the mining of the contextual data surrounding the failed logon data. Both checking against user's own history, and checking against the failed logon attempts of the entire user base may be used to determine a final score or final scores for each type of check to enable the system to decide if the user logon request is anomalous or familiar or how anomalous or familiar the user logon request is.

If the attempt is too anomalous, the logon attempt may be denied outright, a request may be made to the user to pass a third factor authentication, or the user may be permitted access to the system with little or restricted system access privileges.

Figure 7:
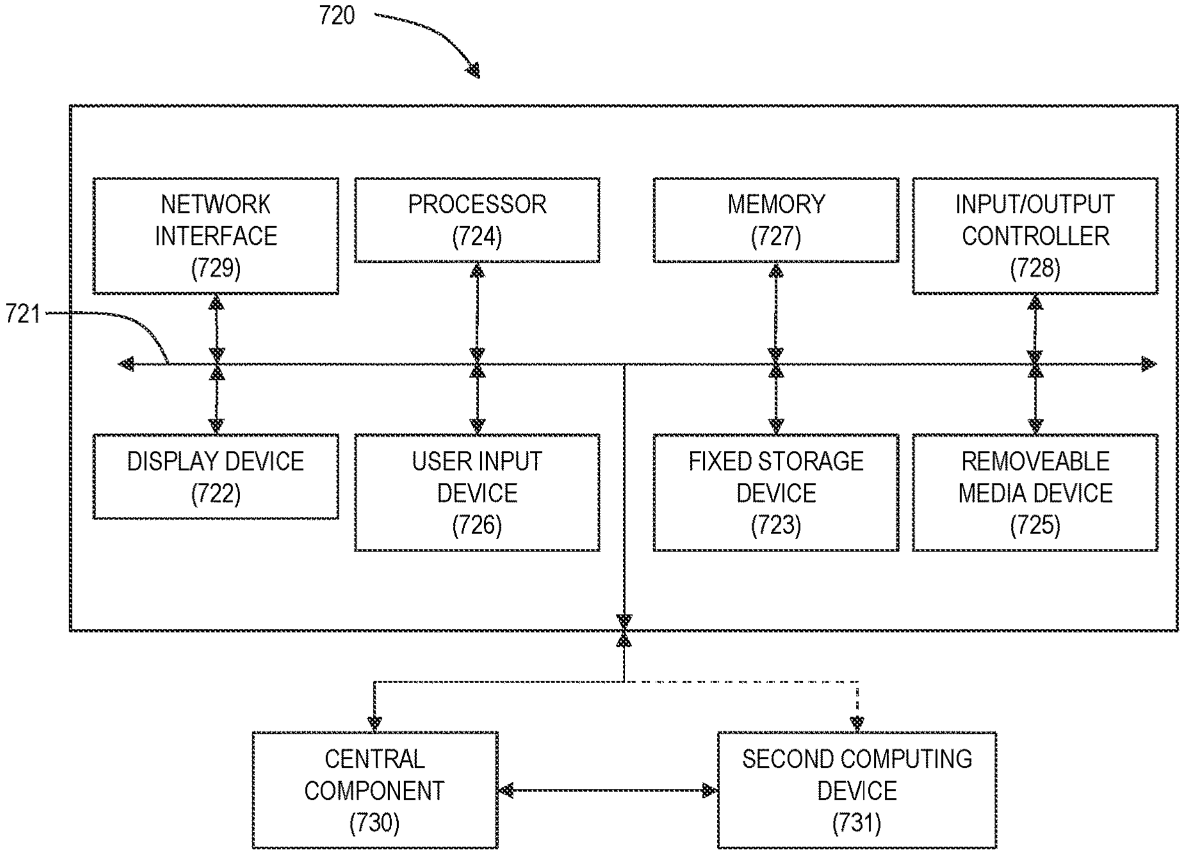
FIG. 7 illustrates an exemplary computer system suitable for implementing implementations of the presently disclosed subject matter.

Implementations of the presently disclosed subject matter may be implemented in and used with a variety of component and network architectures. FIG. 7 is an example computer 720 suitable for implementing implementations of the presently disclosed subject matter. As discussed in further detail herein, the computer 720 may be a single computer in a network of multiple computers. As shown in FIG. 7, computer may communicate a central component 730 (e.g., server, cloud server, database, etc.). The central component 730 may communicate with one or more other computers such as the second computer 731. According to this implementation, the information obtained to and/or from a central component 730 may be isolated for each computer such that computer 720 may not share information with computer 731. Alternatively, or in addition, computer 720 may communicate directly with the second computer 731.

The computer (e.g., user computer, enterprise computer, etc.) 720 includes a bus 721 which interconnects major components of the computer 720, such as a central processor 724, a memory 727 (typically RAM, but which may also include ROM, flash RAM, or the like), an input/output controller 728, a user display 722, such as a display or touch screen via a display adapter, a user input interface 726, which may include one or more controllers and associated user input or devices such as a keyboard, mouse, Wi-Fi/cellular radios, touchscreen, microphone/speakers and the like, and may be closely coupled to the I/O controller 728, fixed storage 723, such as a hard drive, flash storage, Fibre Channel network, SAN device, SCSI device, and the like, and a removable media component 725 operative to control and receive an optical disk, flash drive, and the like.

The bus 721 enable data communication between the central processor 724 and the memory 727, which may include read-only memory (ROM) or flash memory (neither shown), and random-access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components.

Applications resident with the computer 720 can be stored on and accessed via a computer readable medium, such as a hard disk drive (e.g., fixed storage 723), an optical drive, floppy disk, or other storage medium 725.

The fixed storage 723 may be integral with the computer 720 or may be separate and accessed through other interfaces. A network interface 729 may provide a direct connection to a remote server via a telephone link, to the Internet via an internet service provider (ISP), or a direct connection to a remote server via a direct network link to the Internet via a POP (point of presence) or other technique. The network interface 729 may provide such connection using wireless techniques, including digital cellular telephone connection, Cellular Digital Packet Data (CDPD) connection, digital satellite data connection or the like. For example, the network interface 729 may enable the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 727, fixed storage 723, removable media 725, or on a remote storage location.

Figure 8:
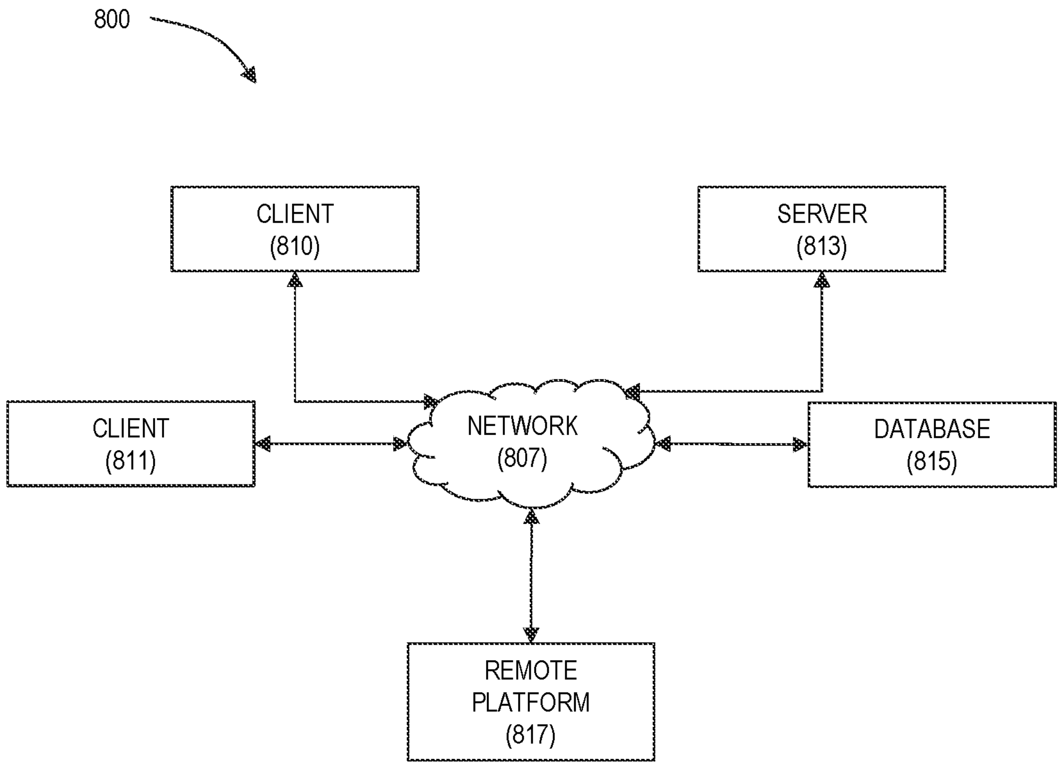
FIG. 8 illustrates an exemplary computer network arrangement suitable for implementing implementations of the presently disclosed subject matter.

FIG. 8 shows an example network arrangement 800 according to an implementation of the disclosed subject matter. One or more clients 810, 811, such as computers, microcomputers, local computers, smart phones, tablet computing devices, enterprise devices, and the like may connect to other devices via one or more networks 807 (e.g., a power distribution network). The network may be a local network, wide-area network, the Internet, or any other suitable communication network or networks, and may be implemented on any suitable platform including wired and/or wireless networks. The clients may communicate with one or more servers 813 and/or databases 815. The devices may be directly accessible by the client's 810, 811, or one or more other devices may provide intermediary access such as where a server 813 provides access to resources stored in a database 815. The clients 810, 811 also may access remote platforms 817 or services provided by remote platforms 817 such as cloud computing arrangements and services. The remote platform 817 may include one or more servers 813 and/or databases 815. Information from or about a first client may be isolated to that client such that, for example, information about client 810 may not be shared with client 811. Alternatively, information from or about a first client may be anonymized prior to being shared with another client. For example, any client identification information about client 810 may be removed from information provided to client 811 that pertains to client 810.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to generate specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general-purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific arrangements and configurations. However, the illustrative examples provided herein are not intended to be exhaustive or to limit embodiments of the disclosed subject matter to the precise forms disclosed. Many modifications and variations are possible in view of the disclosure provided herein. The embodiments and arrangements were chosen and described in order to explain the principles of embodiments of the disclosed subject matter and their practical applications. Various modifications may be used without departing from the scope or content of the disclosure and claims presented herein.

What is claimed is:

1. A method of authenticating a user logon, the method comprising:

building a user logon profile with a plurality of user logon features gathered during at least one successful attempted user logon;

determining a logon feature novelty score for each of the plurality of user logon features based on a number of user logon feature events over a total number of user logon events;

receiving a user logon request for authentication and extracting current user logon features associated with the user logon request;

retrieve corresponding logon feature novelty scores of the current user logon features from the user logon profile based on the extracted current user logon features;

determine a first distance function score for the corresponding logon feature novelty scores of the current user logon features;

build a failed logon attempt database with a plurality of failed user logon features corresponding to a plurality of failed user logon attempts;

determine a failed logon feature novelty score for each of the plurality of failed user logon features based on a number of failed user logon feature events over a total number of failed user logon events;

extract the failed logon feature novelty scores corresponding to current user logon features;

determine a second distance function score for the corresponding failed logon feature novelty scores of the current user logon features; and determining to one of allow or deny the user logon request based on at least one of the first distance function score and the second distance function score.

2. The method of claim 1, wherein the plurality of user logon features includes at least one of:

ASN data;

geophysical location coordinate data;

UA string data;

Accept Language data;

device information;

OS version information;

at least one of date and day of the user logon; and at least one of a time and part of a day of the user logon.

3. The method of claim 1, wherein the building of the user logon profile includes creating a user feature vector based on the plurality of user logon features and the associated logon feature novelty scores.

4. The method of claim 1, wherein the user logon profile is collected over a predetermined period of time.

5. The method of claim 1, wherein the building the user logon profile includes building a per-user logon profile database including a plurality of users.

6. The method of claim 1, further comprising updating the user logon profile with the current user logon features.

7. The method of claim 1, wherein the first distance function score is calculated based on a square root of a sum of the squares of the corresponding logon feature novelty scores of the current user logon features from the user logon on profile over a square root of the number of the current logon features used in the user logon request.

8. The method of claim 1, wherein the second distance function score is calculated based on a square root of a sum of the squares of the failed logon feature novelty scores corresponding to the current user logon features, over a square root of the total number of the failed logon features.

9. The method of claim 1, further comprising evaluating the determined first distance function score being one of at or between a familiar value and an anomalous value.

10. The method of claim 9, wherein the determining to one of allow or deny the user logon request based on the first distance function score includes determining one of how close or how far a score value determined from the first distance function score is to one of a familiar logon or an anomalous logon.

11. The method of claim 1, further comprising evaluate the determined second distance function score being one of at or between a familiar value and an anomalous value.

12. The method of claim 11, wherein the determining to one of allow or deny the user logon request based on the second distance function score includes determining one of how close or how far a score value determined from the second distance function score is to one of a familiar logon or an anomalous logon.

13. A method comprising:

providing a profile builder module configured to build a user logon profile with a plurality of user logon features gathered during at least one successful attempted user logon, and determine a logon feature novelty score for each of the plurality of user logon features based on a number of user logon feature events over a total number of user logon events;

providing a user logon score module configured to receive a user logon request for authentication and extracting current user logon features associated with the user logon request, retrieve corresponding logon feature novelty scores of the current user logon features from the user logon profile based on the extracted current user logon features, and determine a first distance function for the corresponding logon feature novelty scores of the current user logon features; and providing a failed logon score module configured to build a failed logon attempt database with a plurality of failed user logon features corresponding to a plurality of failed user logon attempts, determine a failed logon feature novelty score for each of the plurality of failed user logon features based on a number of failed user logon feature events over a total number of failed user logon events, extract the failed logon feature novelty scores corresponding to current user logon features, and determine a second distance function for the corresponding logon feature novelty scores of the current user logon features; and determining to one of allow or deny the user logon request based on at least one of the first distance function and the second distance function.

14. The method of claim 13, wherein the plurality of user logon features includes at least one of:

ASN data;

geophysical location coordinate data;

UA string data;

Accept Language data;

device information;

OS version information;

at least one of date and day of the user logon; and at least one of a time and part of a day of the user logon.

15. The method of claim 13, wherein the building of the user logon profile includes creating a user feature vector based on the plurality of user logon features and the associated logon feature novelty scores.

16. The method of claim 13, wherein user logon profile is collected over a predetermined period of time.

17. The method of claim 13, wherein building the user logon profile includes building a per-user logon profile database including a plurality of users.

18. The method of claim 13, wherein the first distance function is calculated based on a square root of a sum of the squares of the corresponding logon feature novelty scores of the current user logon features from the user logon on profile over a square root of the number of the current logon features used in the user logon request.

19. The method of claim 13, wherein the second distance function is calculated based on a square root of a sum of the squares of the failed logon feature novelty scores corresponding to the current user logon features, over a square root of the total number of the failed logon features.

20. A system comprising:

a user interface logon portal configured to receive a user logon request for authentication;

at least one of an identity store and a multifactor authentication check logic circuit configured to check parameters of the user logon request to determine authenticity; and a context check logic circuit including a profile builder logic circuit configured to build a user logon profile with a plurality of user logon features gathered during at least one successful attempted user logon, and determine a logon feature novelty score for each of the plurality of user logon features based on a number of user logon feature events over a total number of user logon events, a logon score logic circuit configured to receive a user logon request for authentication and extracting current user logon features associated with the user logon request, retrieve corresponding logon feature novelty scores of the current user logon features from the user logon profile based on the extracted current user logon features, and determine a first distance function for the corresponding logon feature novelty scores of the current user logon features, and a failed logon score logic circuit configured to build a failed logon attempt database with a plurality of failed user logon features corresponding to a plurality of failed user logon attempts, determine a failed logon feature novelty score for each of the plurality of failed user logon features based on a number of failed user logon feature events over a total number of failed user logon events, extract the failed logon feature novelty scores corresponding to current user logon features, and determine a second distance function for the corresponding logon feature novelty scores of the current user logon features, wherein the system is configured to determine to one of allow or deny the user logon request based on at least one of the first distance function and the second distance function.

* * * * *